United States Patent [19]

Walker

[11] 4,205,863
[45] Jun. 3, 1980

[54] WHEELED CARRIER FOR SUITCASES AND THE LIKE

[76] Inventor: Brooks Walker, 1280 Columbus Ave., San Francisco, Calif. 94133

[21] Appl. No.: 896,885

[22] Filed: Apr. 17, 1978

[51] Int. Cl.² ............................................ B62B 11/00
[52] U.S. Cl. ............................... 280/652; 280/47.13 R
[58] Field of Search ................ 280/652, 654, 47.13 R, 280/79.1 R

[56] References Cited

U.S. PATENT DOCUMENTS

| | | | |
|---|---|---|---|
| 3,558,157 | 1/1971 | Neumann | 280/652 |
| 3,827,707 | 8/1974 | Bierman | 280/654 |
| 4,037,858 | 7/1977 | Adams | 280/652 |
| 4,072,319 | 2/1978 | Berger | 280/654 |

*Primary Examiner*—Robert R. Song
*Attorney, Agent, or Firm*—Gordon Wood

[57] ABSTRACT

A wheeled carrier particularly adapted for transporting suitcases and like or other articles. A support for the suitcase is provided with a pair of removable ground wheels which are adapted to be stored within the support when not in use. The support is provided with a pair of links for engaging a side of the suitcase substantially at right angles to the side engaged by the support. The links are swingably connected to the support in such a manner that the links and support cooperate to support the suitcase adequately although the parts may be made of extremely lightweight elements. The suitcase support is adapted to be manually manipulated by means of an elongated member such as a walking cane, umbrella, sectioned handle, or like article.

4 Claims, 5 Drawing Figures

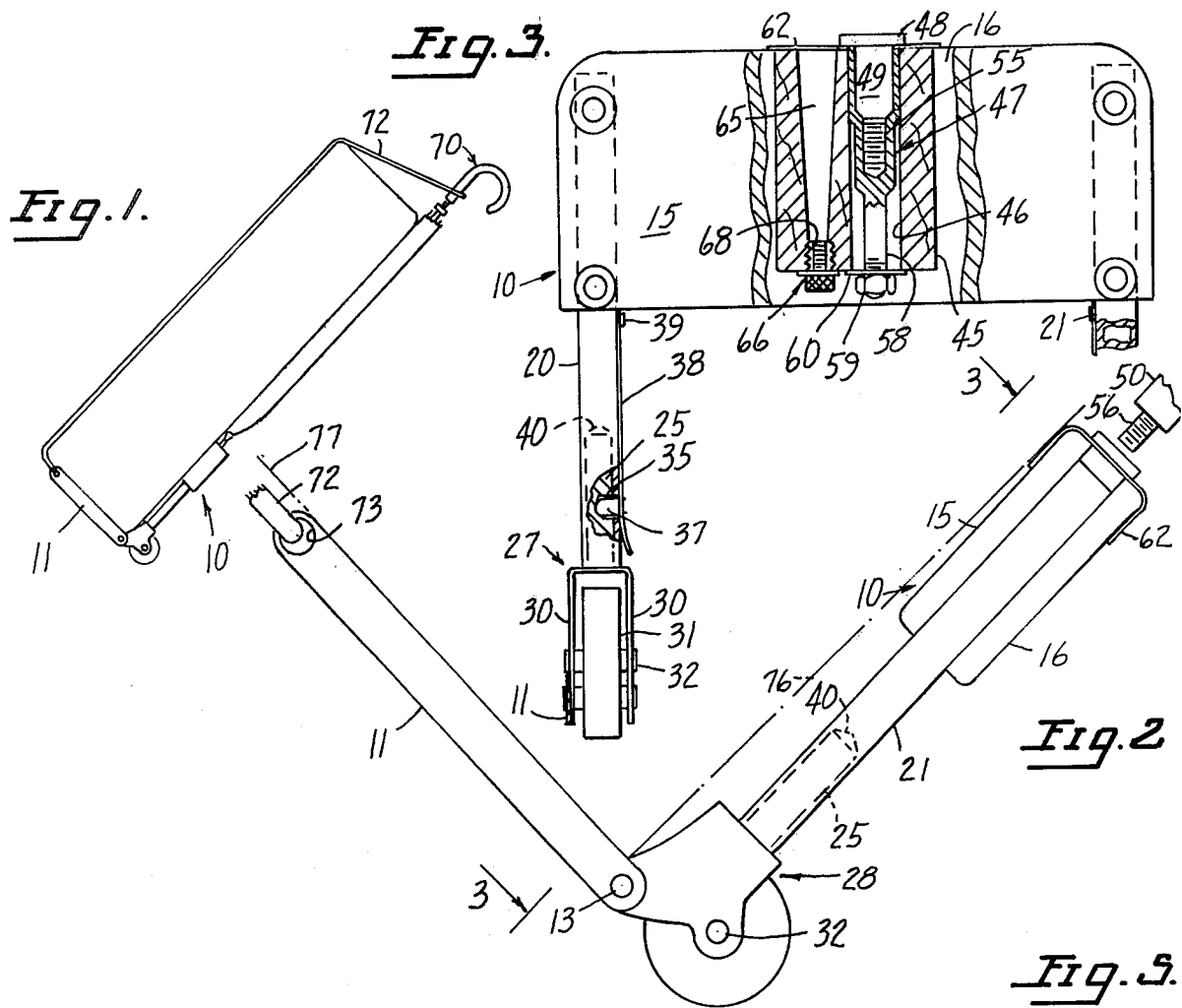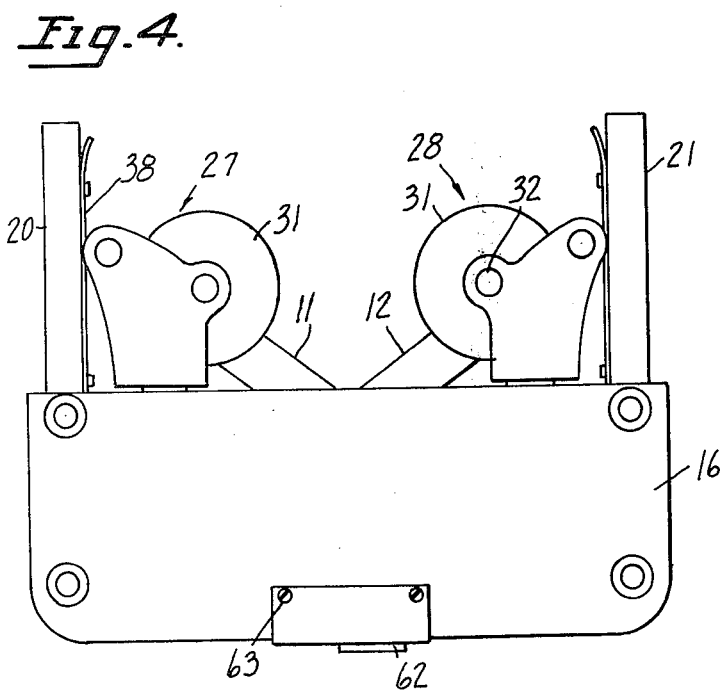

WHEELED CARRIER FOR SUITCASES AND THE LIKE

This invention relates to a wheeled carrier for articles such as suitcases, luggage and the like or other objects. Heretofore various types of devices have been provided to permit wheeling suitcases and other articles. In some cases a suitcase is provided with permanent wheels, but such cases are subject to damage during handling of the suitcase in transit or must be molded into the suitcase and are not suitable for softside cases. In addition, if the wheels are made relatively small to minimize such damage it becomes difficult to wheel the suitcases on shag rugs, concrete, asphalt and like surfaces.

Readily detachable carrier means have also been provided but in many instances such removable carriers have been relatively bulky when folded for storage, thus defeating one of their objects. In connection with removable carriers it is very desirable to make the same compact enough to fit within the many types of carry-on bags and briefcases which a traveler is permitted to place under the seat of an airplane or to occupy a small space when otherwise not in use.

The main object of the present invention is the provision of a novel carrier for suitcases the the like and which carrier may be arranged in an extremely compact condition for thin compact storage while not in use.

Another object of the invention is the provision of a compact suitcase carrier which permits the use of relatively large wheels without increasing the stored bulk of the carrier and thereby permitting use of the carrier on many supporting surfaces including shag rugs, rough concrete and asphalt.

Still another object of the invention is the provision of a wheeled carrier which is adapted to cooperate with an elongated member such a walking cane or umbrella which are normally carried by many travelers.

Other objects and advantages will be apparent from the following specification and from the drawings.

FIG. 1 is a side elevation of the carrier in use with a conventional suitcase and showing an umbrella cooperating with the carrier to permit manual manipulation of the same.

FIG. 2 is an enlarged side elevation of the carrier arranged for use in carrying the suitcase of FIG. 1.

FIG. 3 is a section through the carrier links and showing the main support as taken in a plane indicated by lines 3—3 of FIG. 2.

FIG. 4 is a side elevation of the carrier inverted and showing the wheels and their mounts in stored condition within the carrier support.

FIG. 5 is a fragmentary cross section through the upper side of the suitcase of FIG. 1 showing removable means for lifting the suitcase when it is standing on end.

The carrier comprises a main support generally designated 10 and a pair of elongated links 11, 12 which are swingably connected to the support 10 by means of rivets 13. The support 10 comprises a pair of side plates 15, 16 which are secured together along their vertical edges by means of legs 20, 21. Said legs are preferably formed of light, tubular material of square cross section so that they may be fixedly secured to the side plates 15, 16 to form a rigid generally U-shaped structure. The open outer ends of legs 20, 21 are adapted to receive therein the square cross sectioned shanks 25 of a pair of wheel mounts generally designated 27, 28 (see FIG. 3).

Each wheel mount includes a pair of cheek plates 30 on which the wheels 31 are rotatably supported by means of pins or rivets 32. Said cheek plates are formed with a laterally offset portion as seen in FIG. 2 to receive the rivets 13 by which the links 11, 12 are swingably supported on the support 10.

As best seen in FIG. 3 the shank 25 of each of the wheel mounts 27, 28 is formed with a laterally opening hole 35 which is adapted to receive therein a pin 37 carried by an elongated flat spring 38 which is secured by one or more rivets 39 to the leg that receives the wheel mount. In order to permit the shank to be readily inserted in the leg to which it is secured the free end of the shank is beveled as indicated at 40 so that by inserting the shank through the open end of the leg the pin 37 is automatically retracted against the resiliency of spring 38 and then snaps into hole 35 to the secured position shown in FIG. 3.

Secured centrally between the sidewalls 15, 16 is a rectangular block 45 which is provided with a vertically extending bore 46 which receives therein an elongated fitting generally designated 47. This fitting 47 is formed with an annular flange 48 at its upper end and a generally cylindrical cavity 49 which is adapted to receive therein the end portion 50 (FIG. 2) of an elongated rod which may be employed to manually manipulate the carrier. Said rod 50 may be of the type shown in Serial No. 885,685, filed Mar. 13, 1978. The cylindrical opening 49 terminates in a smaller diameter internally threaded portion 55 which is adapted to receive therein the threaded end 56 of the rod 50. The fitting 47 terminates in a threaded shank 58 to permit the fitting to be secured to the block by means of nut 59 and washer 60.

To provide additional rigidity to the structure a lightweight sheet metal plate 62 may be bent over the top of the wheel mount and secured in place by means of screws 63 (FIG. 4). The plate 62 may be apertured to receive the fitting 47 therein.

Said plate 62 may be provided with another aperture registering with an upwardly opening hole 65 which communicates at its lower end with a ferrule 66 which may be screw threaded within the block 45 and provided with an internally threaded hole 68 which is adapted to cooperate with the tip of a conventional umbrella which has been modified by providing the tip with external threads to cooperate with the threaded holes 68. By this structure it will be noted that the suitcase may be manually manipulated by means of the umbrella generally designated 70 in FIG. 1. As seen in FIG. 1 a flexible elastic cord 72 may be secured at its ends within openings 73 in the outer ends of links 11, 12 and formed to provide a loop which may be then stretched over the handle portion of the umbrella, cane, or multiple part rod 50 as seen in FIG. 1. In addition to the use of the openings 65 and 49 for use with an umbrella and multiple part rod respectively the fitting 47 may be removed to permit the outer end of a cane or the like to be received in bore 46.

One of the features of the above described structure is that the links 11 and 12 are connected to the wheel mounts 27, 28 at pivot points 13 which are extremely close to the supporting side of the support 10. The result of this structure is that the adjacent sides of the suitcase that are supported on the carrier and that are indicated in dot-dash lines 76, 77 in FIG. 2 engage the carrier so that the weight acting on links 11, 12 is concentrated extremely close to the pivots 13 so that there is little tendency for the links 11, 12 to swing downwardly from the position of FIG. 2 due to the weight of the suitcase. It will also be apparent that the structure permits the suitcase to be swung to a vertical position so that the weight of the same rests on the links 11, 12 when the user is obliged to stop temporarily at Customs, for example.

When it becomes necessary to pick up the suitcase as when going up or down stairs or escalators the structure of FIG. 5 makes this extremely simple even when there is no handle on the top side of the suitcase. In this case a short length of dowel 80 may be provided with a transverse hole or slot 81 for receiving therethrough the squeezed end of a relatively wide fabric band 82 which may be clamped between the opposed edges of the two parts of the suitcase as best seen in FIG. 5. By providing a plurality of enlargements 83 on the band 82 the height of the dowel 80 may be adjusted to suit the height of the hand of the user.

An extremely important advantage of the invention is seen in FIG. 4 wherein the wheel mounts 27, 28 are shown in their stored position with the shanks 25 of said mounts received between the side plates 15, 16 together with the links 11, 12. It will be apparent that the stored carrier of FIG. 4 may be readily placed within a conventional carry-on bag or suitcase when the same is not in use. If desired, the elastic cord 72 may be removed or, preferably, wrapped around the structure of FIG. 4.

It will also be noted that the space occupied by the assembly may be considerably reduced, though not to the extent shown in FIG. 4, by removing the wheel mounts from the support 10 and reinserting them at 90° from the working position of FIG. 3 so that the wheels are substantially coplanar with the support 10.

I claim:

1. A wheeled carrier for articles such as suitcases, luggage and other objects comprising:
    a support adapted to engage one generally downwardly facing side of such article,
    said support including a pair of ground wheels carried by said support and rotatably supported relative thereto,
    a link swingably connected to said support and adapted to be swung to a position engaging a side of said article adjacent said one side and substantially at right angles thereto,
    means for securing said link, article and support together for movement as a unit on said wheels,
    said support including a pair of opposed side plates and a pair of parallel tubular legs fixedly secured between said plates to form a generally U-shaped support, said ground wheels being provided with mounts including shanks removably received between said plates when said wheel mounts are stored between said legs.

2. A carrier according to claim 1 wherein said support is provided with means for removably receiving an elongated handle therein.

3. A carrier according to claim 2 wherein said handle is an umbrella having a tip externally threaded to be threadedly secured within a complementarily threaded element on said support.

4. A carrier according to claim 2 wherein said handle is provided with means for securing the same to said support when rotated relative to the latter.

* * * * *